(12) United States Patent
Ferrari et al.

(10) Patent No.: US 8,857,754 B2
(45) Date of Patent: Oct. 14, 2014

(54) DEVICE FOR LAUNCHING AND RECOVERING A DRONE, AND AN ASSOCIATED AIRCRAFT

(75) Inventors: Laurence Ferrari, Aix en Provence (FR); Francois Malburet, Coudoux (FR); Georges Descombes, Paris (FR)

(73) Assignee: Airbus Helicopters, Marignane Cedex (FR)

( * ) Notice: Subject to any disclaimer, the term of this patent is extended or adjusted under 35 U.S.C. 154(b) by 155 days.

(21) Appl. No.: 13/461,864

(22) Filed: May 2, 2012

(65) Prior Publication Data

US 2012/0292430 A1 Nov. 22, 2012

(30) Foreign Application Priority Data

May 3, 2011 (FR) ...................................... 11 01363

(51) Int. Cl.
*B64D 5/00* (2006.01)
*B64F 1/02* (2006.01)
*B64D 1/22* (2006.01)

(52) U.S. Cl.
CPC .............. *B64F 1/02* (2013.01); *B64C 2201/027* (2013.01); *B64D 1/22* (2013.01)
USPC ........................................... 244/2; 244/110 R

(58) Field of Classification Search
USPC ..... 244/1 TD, 2, 110 R, 110 C, 110 F, 110 G, 244/172.4, 137.4, 3, 135 A, 172.5
See application file for complete search history.

(56) References Cited

U.S. PATENT DOCUMENTS

| | | | |
|---|---|---|---|
| 3,389,880 A | 6/1968 | Ferguson | |
| 4,523,729 A * | 6/1985 | Frick | 244/115 |
| 4,753,400 A | 6/1988 | Reuter | |
| 5,906,336 A * | 5/1999 | Eckstein | 244/135 A |
| 7,152,828 B1 * | 12/2006 | Garcia et al. | 244/135 A |
| 7,195,200 B2 | 3/2007 | Yamane | |
| 7,815,149 B1 * | 10/2010 | Howard et al. | 244/172.4 |
| 8,083,173 B2 | 12/2011 | Arlton | |
| 8,162,256 B2 | 4/2012 | Goossen | |
| 2004/0089767 A1* | 5/2004 | Harrison | 244/137.4 |
| 2006/0249623 A1 | 11/2006 | Steele | |
| 2011/0006151 A1* | 1/2011 | Beard | 244/3 |

FOREIGN PATENT DOCUMENTS

| | | |
|---|---|---|
| DE | 3206299 A1 | 9/1982 |
| EP | 1645505 A2 | 4/2006 |
| EP | 2103518 A2 | 9/2009 |
| FR | 2941922 A1 | 8/2010 |
| WO | 2008089432 A2 | 7/2008 |

OTHER PUBLICATIONS

Search Report and Written Opinion; Application No. FR 1101363; dated Dec. 12, 2011.

* cited by examiner

*Primary Examiner* — Tien Dinh
*Assistant Examiner* — Michael Kreiner
(74) *Attorney, Agent, or Firm* — Brooks Kushman P.C.

(57) ABSTRACT

A device for launching and recovering a drone for being fastened to an aircraft is provided. The device includes a docking plate for a drone provided with a securing/releasing mechanism for the drone. The docking plate being secured to a flared guide for guiding the drone towards the docking plate.

10 Claims, 2 Drawing Sheets

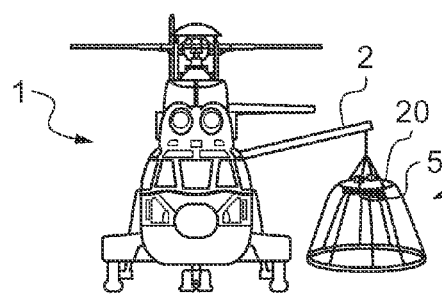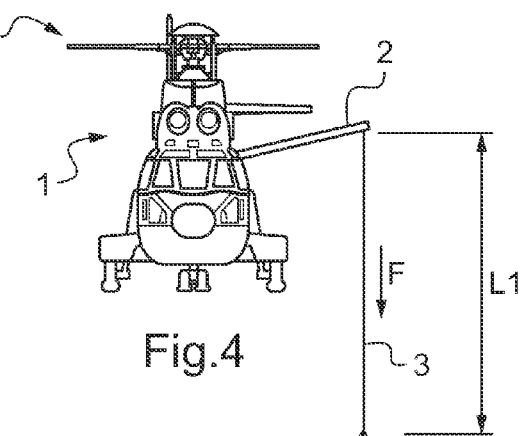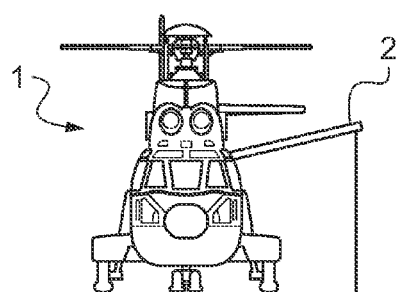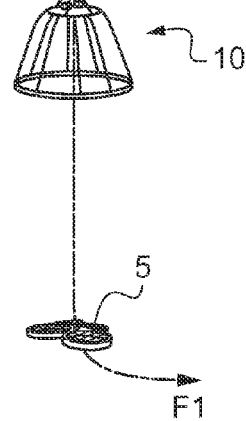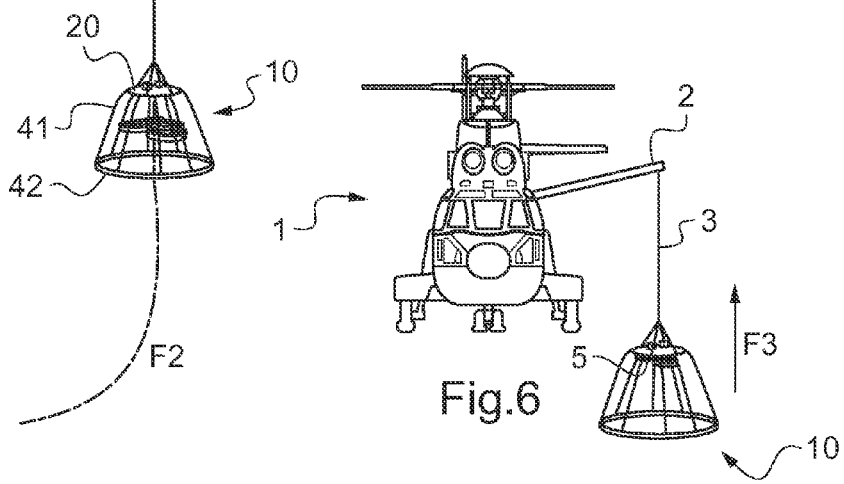

DEVICE FOR LAUNCHING AND RECOVERING A DRONE, AND AN ASSOCIATED AIRCRAFT

CROSS REFERENCE TO RELATED APPLICATIONS

The present application claims priority to French patent application no. FR 11/01363 filed on May 3, 2011, the disclosure of which is incorporated in its entirety by reference herein.

BACKGROUND OF THE INVENTION (1) Field of the Invention

The present invention relates to a device for launching and recovering a drone, and to the associated aircraft. The invention thus lies in the technical field of aircraft.

(2) Description of Related Art

Aircraft include in particular helicopters that are of long autonomy but that are voluminous, expensive, and the subject of flying constraints for ensuring the safety of their occupants. Furthermore, in order to ensure the safety of its occupants, a helicopter must not fly in certain air spaces, for example when the ground relief is likely to lead to an accident or when the atmosphere is contaminated in particular by dangerous chemicals, bacteria, or indeed radioactive elements after an accident.

Drones are also known, i.e. aircraft that do not have an on-board pilot and that are of limited autonomy. Nevertheless, drones are of small size which means that they can fly close to dangerous ground relief, and they can be remotely controlled, e.g. in order to fly in an environment that is polluted and dangerous for people. Furthermore, the cost of a drone is much less than that of a helicopter. Under such circumstances, a drone may sometimes be considered as being a consumable, should it turn out to be difficult to recover and if recovery is not essential.

These two types of aircraft can thus be seen to be complementary.

It would be advantageous to fit an aircraft and in particular a helicopter with a drone that can be launched while the aircraft is in flight. The helicopter can then cover a relatively long distance in order to take the drone quite close to a zone that is to be investigated, possibly a zone that is not accessible to the helicopter for reasons associated with the safety of personnel on board the helicopter.

By launching a drone from a helicopter, limitations associated with the short autonomy of a drone are avoided.

Furthermore, it is advantageous to be able to recover the drone using the helicopter, e.g. in order to refuel it while it is carrying out its mission or else in order to recover equipment carried by the drone.

Nevertheless, it is found difficult to control the path followed by a drone in a zone that is disturbed by the wash from the lift rotor of a helicopter, both for launching the drone and also for recovering the drone, while also avoiding any risk of collision between the two aircraft. The lift main rotor of a helicopter has a stream of air passing therethrough, this stream of air greatly disturbing aerodynamic conditions within a zone over which the helicopter is flying. Furthermore, it can be understood that the lighter the drone, the greater the uncertainty concerning its flight path within the zone that is disturbed by the stream of air passing through the helicopter lift rotor.

In addition to the difficult air/flow conditions that are to be encountered close to a helicopter, it is onerous to provide a drone with accurate piloting means. Furthermore, such means are bulky and of non-negligible weight.

It is therefore very difficult to fly a drone close to a helicopter without risk after the drone has been launched from said helicopter or for the purpose of securing a drone to the helicopter.

It can be understood that it may also be difficult to fly a drone without risk in other circumstances, e.g. close to a ship or a building.

In the state of the art, devices are known for launching an aircraft from a moving platform. Such devices do not appear to be suitable for limiting the risk associated with flying a drone close to a helicopter and in particular in the stream of air passing through the lift rotor of the helicopter.

For example, document WO 2008/089432 discloses an aircraft for launching a drone that is attached to a parachute. After launching, the parachute becomes detached from the drone and the drone becomes autonomous.

Furthermore, devices exist that use anchoring hooks or simple nets for recovering the drones in flight. Such devices appear to be unsuitable for launching and recovering a drone that does not have accurate piloting means, and all the more so when flying close to a helicopter.

Similarly, approach methods are known for positioning a drone vertically over a landing zone. Reference may be made for example to document EP 1 645 505.

Furthermore, the state of the art also includes the following documents: EP 2 103 518 A2, US 2006/249623A1, FR 2 941 922 A1, U.S. Pat. No. 3,389,880 A, DE 3 206 299 A1, and U.S. Pat. No. 4,753,400 A.

BRIEF SUMMARY OF THE INVENTION

The present invention thus seeks to propose a device for launching and recovering a drone, which device is simple to implement, and in particular is suitable for use on an aircraft of the helicopter type.

According to the invention, a device for launching and recovering a drone, and suitable for fastening to an aircraft is remarkable in particular in that the device comprises docking means for docking a drone, the docking means being provided with securing/releasing means for the drone, the docking means being secured to flared guide means for guiding the drone towards the docking means.

The guide means thus extend from an open inlet section to a docking section, the docking means being arranged in said docking section of the guide means.

Thus, the device may be carried by an aircraft, and more particularly by a helicopter.

When the aircraft takes the drone to a zone that is to be explored, the drone is secured to the docking means by the securing/releasing means, in the volume defined by the guide means.

In order to release the drone, the securing/releasing means are activated so as to release the drone from the docking means, the drone moving away from the aircraft following a route defined by the guide means, in particular so as to avoid coming into contact with the aircraft.

Conversely, in order to recover the drone, the drone is flown towards the docking means, with the maneuvering of the drone close to the aircraft being constrained by the guide means. The drone thus penetrates into the guide means via the inlet section of the guide means, after which it goes to the docking means.

The device of the invention is thus relatively simple and can easily be fastened to a structure or to an aircraft.

Furthermore, the guide means avoid having any recourse to expensive positioning systems for the drone, and the drone maneuvers in a safe space that is defined by the guide means.

Furthermore, it can be understood that the drone may be fastened to the docking means in various distinct positions, this characteristic serving to reduce the accuracy required of the means for piloting and locating the drone.

The device may include one or more of the following additional characteristics.

In particular, the securing/releasing means may comprise at least one reversible magnetizing means secured to the docking means to magnetize the docking means on request, the docking means being magnetized in order to be secured to a drone and being no longer powered electrically in order to release the drone.

The reversible magnetizing means may be of the electromagnet type. The docking means may also comprise a metal plate, the metal plate having a drone docking face and a face carrying the power supply means, for example.

Furthermore, the power supply means and the docking means may constitute the same piece of equipment, being equipment of the type used for handling vehicles in a car compactor unit, for example.

The reversible magnetizing means may be dimensioned so as to have a predetermined power of attraction enabling it to cause a drone located in the inlet section of the guide means to be attracted against the docking means. Under such circumstances, the drone may be an inexpensive drone that does not have accurate piloting means, with progress of the drone to the docking means being requested by the reversible magnetizing means and with the path followed by the drone being conditioned by the guide means.

It should be observed that the device then makes it possible to recover a drone that is inoperative or that has suffered an accident. It then suffices to place the device over the drone that is to be recovered, with the magnetizing means then attracting the drone to the docking means.

When the device is arranged on an aircraft, the dimensioning of the magnetizing means may also take into consideration the nature of the equipment on board the aircraft so that the magnetizing means do not generate a magnetic field that might disturb such equipment unduly.

Additionally, the securing/releasing means optionally include at least one rechargeable battery arranged on the docking means for electrically powering said at least one reversible magnetizing means.

Furthermore, the guide means may comprise a plurality of deformable tubes connecting the docking means to a ring, the ring defining an inlet section defining an approach zone for a drone heading towards the docking means. Under such circumstances, the guide means are in the form of an upside-down basket defined by the deformable tubes.

The deformable nature of the tubes may optionally be obtained by using so-called "flexible" materials, with this characteristic seeking to avoid the tubes breaking in the event of striking ground relief.

Thus, such a device mounted on a rotorcraft may enable a damaged drone that can no longer perform its own landing to be put down on the ground. For example, the rotorcraft may lower the device onto the ground so that the tubes damp the impact against the ground. During this operation, the drone remains fastened to the docking means. A ground crew can then recover the drone. It should be observed that this operation does not require the rotorcraft to land.

Two adjacent deformable tubes may be spaced apart by a separation distance, with the separation distance being less than some minimum characteristic length of a drone that is to be associated with the device.

For example, for a drone that can fly level within a space defined by a circle circumscribing the drone, i.e. a "circumcircle", the separation distance may be less than the radius of the circumcircle. Similarly, the inlet section defined by the ring may optionally have an inlet diameter lying in the range three to four times the diameter of the circumcircle, with the tubes extending from the docking means to the ring over a height that may optionally lie in the range five to six times said diameter of the circumcircle.

Such characteristics greatly improve the maneuvering of the drone in the proximity of a helicopter.

Furthermore, a minimum length separates the docking means from the inlet section of the guide means, and the center of gravity of the guide means are optionally situated in a volume of the guide means that is defined in elevation between the inlet section and an intermediate section, the intermediate section being arranged between the inlet section and the docking means, and being spaced apart from the inlet section by a bottom distance that is equal to one-third of said minimum length.

The device then presents advantageous stability in flight.

According to another aspect, the guide means are provided with a fastener system for fastening to a cable of a winch.

It should be observed that the term "winch" is used to designate any device suitable for moving the docking means by exerting a force on a cable fastened to the fastener system.

Thus, it is possible to move the device temporarily away from a helicopter, e.g. during stages of launching and recovering a drone so as to have the drone at a distance from the stream of air passing through the lift rotor of the helicopter during these particular stages of flight.

Such a fastener system may include slings connected by fastener means to the cable of the winch.

In addition to a device for launching and recovering a drone, the invention provides an aircraft including such a launching and recovery device together with the associated drone, and more particularly a rotorcraft including such a launching and recovery device. Under such conditions, the drone may be piloted by a person on board the aircraft, for example.

Associating an aircraft with a drone, and more particularly a rotorcraft of the helicopter type with a drone, presents an advantage in particular for performing life-saving missions in geologically difficult terrain. An injured person may then be located with the help of a drone carrying cameras, for example.

It is also possible to envisage providing the drone with communications means such as a microphone and/or a loudspeaker for communicating with an injured person without it being necessary to wait for a rescuer to arrive, e.g. in order to assess the person's injuries or indeed to inform the injured person about the next steps. The drone may optionally also be provided with an emergency medical kit or with provisions to bridge the gap until help can arrive.

It can be understood that the combination of aircraft and drone can perform various other types of mission. For example, the drone may be used to establish communication with people who are isolated and not accessible, such as people caught in a building where the stairwell is no longer usable, or to which access has become obstructed, in particular.

Furthermore, the aircraft may include one or more of the following characteristics.

The aircraft may include a winch, the winch having a cable fastened to a fastener system of the device.

When the aircraft has a rotary wing of a given rotor diameter, the cable advantageously extends over a length that is not less than three times said given rotor diameter.

Furthermore, the aircraft with a drone may be secured to the device in reversible manner, the drone optionally including peripheral protection means for protecting it against impacts with the device.

For example, the peripheral protection means may include rubber protective buffers, deformable structural elements, or indeed grids protecting rotary elements.

The drone optionally includes mission instruments such as a camera, microphones, equipment fastener hooks, at least one screen, sounding balloons, or small pieces of equipment specific to a mission.

In addition, the drone may carry at least one transmitter so as to act as a beacon for vertically marking a fixed point during a given period.

According to another aspect, the drone may be fitted with measuring equipment, e.g. in order to take samples of the atmosphere so as to detect signs of pollution before involving a rotorcraft.

According to another aspect, the device may include a transmitter beacon arranged on the docking means, the drone having guide means to perform the final approach stage towards the docking means automatically once the drone is located in a zone very close to said device.

Furthermore, the device may include securing/releasing means provided with reversible magnetizing means.

Under such circumstances, the device may receive any commercially available drone providing the drone is fitted with at least one magnet or providing its metal portions suffice magnetically.

Thus, the aircraft may include a drone suitable for being secured to the launching and recovery device in reversible manner, the drone optionally including at least one magnet for fastening in reversible manner to magnetic docking means of the device.

BRIEF DESCRIPTION OF THE SEVERAL VIEWS OF THE DRAWINGS

The invention and its advantages appear in greater detail from the following description of an embodiment given by way of illustration and with reference to the accompanying figures, in which:

FIGS. 3 to 6 are diagrams for explaining a mode of operation of the invention.

DETAILED DESCRIPTION OF THE INVENTION

Elements that are present in more than one of the figures are given the same references in each of them.

Figure 1:
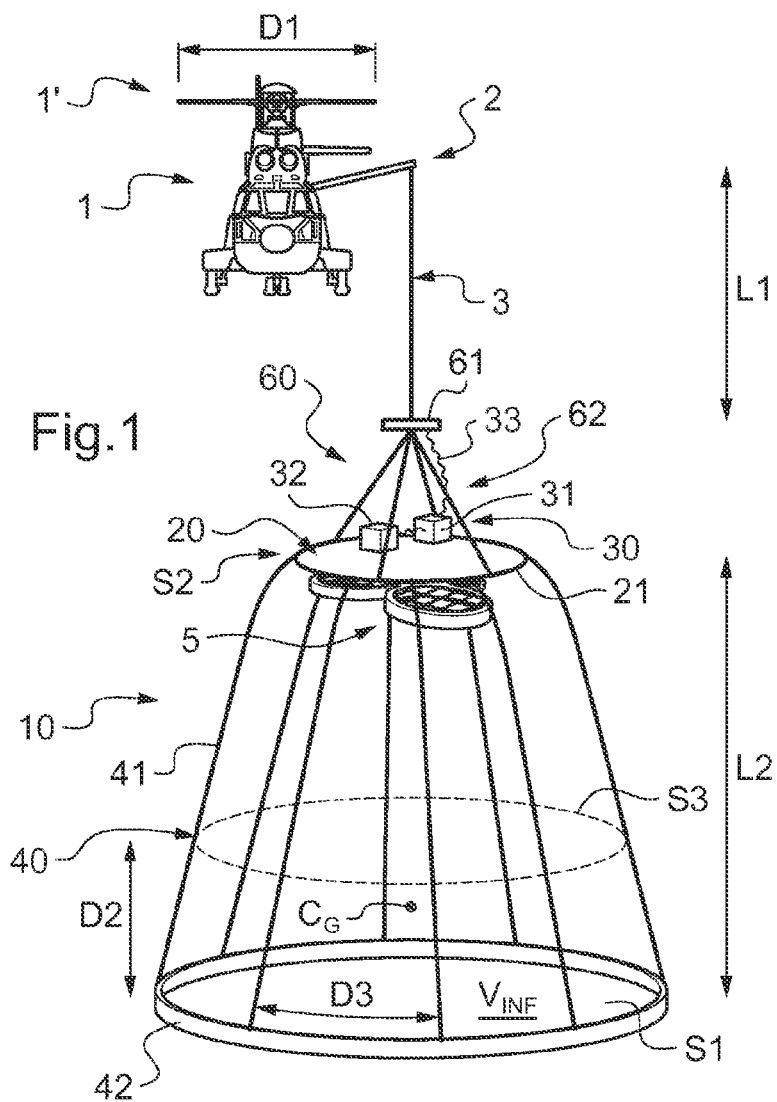
FIG. 1 is a view of an aircraft of the invention provided with a device for launching and recovering a drone.

FIG. 1 shows an aircraft 1. More particularly the aircraft 1 is a rotorcraft of the helicopter type having a rotary wing 1' with a rotor of given diameter D1.

The aircraft 1 has a drone 5, which drone 5 may be fastened in reversible manner to the aircraft 1 by means of a launching and recovery device 10, referred to below more simply as the "device" for convenience. The device 10 is deliberately drawn enlarged in FIG. 1 relative to its real size in order to facilitate understanding.

Under such circumstances, the aircraft 1 has a winch 2 co-operating with a cable 3 supporting the device 10 for moving the device 10 towards or away from the airframe of the aircraft 1. Advantageously, the cable may present an extended length L1 that is not less than three times the given rotor diameter D1 so that maneuvers of the drone 5 are disturbed little by the stream of air passing through the rotary wing 1'.

In addition, the device 10 includes docking means 20 co-operating with means for securing/releasing a drone 5.

For example, the docking means 20 comprise a metal plate 21 attached to the cable 3 by a fastener system 60. The fastener system shown includes slings 62 attached by fastener means 61 to the cable 3, such as a release hook secured to the cable 3, for example.

Under such circumstances, the securing/releasing means may comprise reversible magnetizing means 31 controlled by a passenger of the aircraft 1 via a wired connection 33 running along the cable 3, for example.

The magnetization means may comprise at least one electromagnet, optionally electrically powered by at least one rechargeable battery 32 of the securing/releasing means 30.

Thus, in order to secure a drone to the docking means, the docking means are magnetized by using the magnetizing means 31. Conversely, in order to release the drone 5 from the docking means 20, the magnetizing means 31 are inhibited so as to demagnetize the docking means 20.

Furthermore, the device 10 includes flared guide means 40 for guiding the drone towards the docking means while recovering the drone, and for guiding the drone towards a zone that is not disturbed by the rotary wing 1' when launching the drone 5.

The guide means 40 then extend in elevation from a docking section S2 secured to the docking means 20 to an open inlet section S1. The guide means 40 are in the form of an upside-down basket, being substantially bell-shaped.

More particularly, the guide means comprise a plurality of deformable tubes 41 extending from the docking means 20 towards a ring 42 defining the inlet section S1.

Two adjacent deformable tubes 41 are then spaced apart by a predetermined maximum separation distance D3 so as to prevent the drone 5 from passing between said two adjacent tubes.

For example, for a drone contained within a circumcircle, the separation distance D3 is less than the radius of the circumcircle. In addition, the inlet section S1 and thus the ring 42 may describe a circle of inlet diameter that lies in the range three to four times the diameter of said circumcircle. Furthermore, the deformable tubes 41 extend from the docking means 20 towards the ring 42 over a height L2 that may optionally lie in the range five to six times said diameter of said circumcircle.

According to another aspect, the center of gravity Cg of the guide means 40 is optionally situated within a volume Vinf of the guide means 40, also referred to as its "bottom" volume. This bottom volume Vinf is defined in elevation by the inlet section S1 and by an intermediate section S3. The intermediate section lies between the inlet section S1 and the docking means 20, the intermediate section being spaced apart from the inlet section S1 by a bottom distance D2 that is equal to one-third of said minimum length L2.

Figure 2:
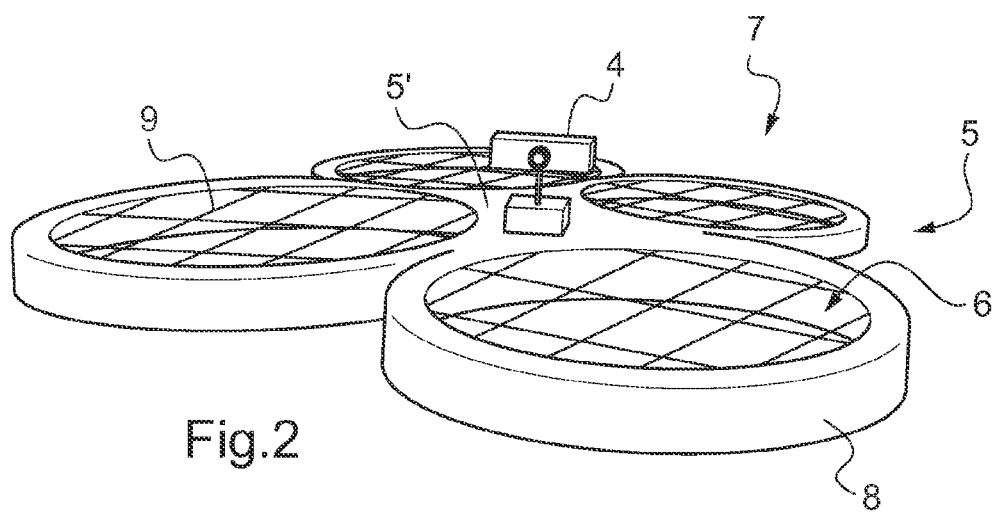
FIG. 2 is a view of such a drone.

FIG. 2 shows a drone 5. Advantageously, the drone 5 includes peripheral impact-protection means 6 such as protective buffers 8 or protective grids 9 for its rotary assemblies.

Furthermore, the drone 5 may carry various items of equipment, such as a camera 4.

The drone 5 that is described also includes a magnet 5' suitable for co-operating with the docking means 20.

FIGS. 3 to 6 explain the methods of launching and recovering the drone 5 using an aircraft 1 of the invention.

With reference to FIG. 3, in order to bring a drone 5 to a given zone, the drone 5 is secured to the docking means 20 of a device 10 by using the securing/releasing means.

In addition, the winch 2 retracts the cable 3 so as to keep the device 10 facing a side of the aircraft 1.

With reference to FIG. 4, in order to launch the drone 5, the winch 2 unreels the cable 3 so as to move the device 10 away from the rotary wing 1' along arrow F through an extended length L1 that is advantageously equal to three times the given rotor diameter of the rotary wing of the aircraft.

An operator then controls the drone 5 so as to make it take up a hovering configuration. The operator may optionally be on board the aircraft 1.

At that point, the securing/releasing means are controlled to release the drone 5 from the docking means 20. In an embodiment, the electrical power supply of magnetizing means is interrupted by switching off the electrical connection between the magnetizing means and the battery that was powering them electrically.

Then, e.g. by using a radio control system, the operator causes the drone 5 to move vertically downwards under the device 10, and then flies it to carry out its mission as represented by arrow F1.

It should be observed that the maneuvering of the drone 5 is not disturbed by the stream of air passing through the rotary wing 1', insofar as the device 10 has been moved away from the rotary wing.

With reference to FIG. 5, in order to recover the drone 5, the operator directs the drone 5 towards the device 10 along arrow F2 so as to position it in the inlet section defined by the ring 42. At this stage, the securing/releasing means may generate a magnetic field that is sufficient to attract the drone 5 towards the docking means 20.

Furthermore, it should be observed that the deformable tubes 41 mitigate any air flow movements that might cause the drone 5 to deviate from its intended path, by guiding the drone 5 towards the docking means, where necessary.

Finally, with reference to FIG. 6, once the drone 5 has been secured to the docking means 20, the cable 3 is wound in by the winch 2 in order to raise the device 10 together with the drone 5 so that it faces a side of the aircraft. It should be observed that the weight of the device 10 plus the associated drone 5 and their upward speed enables a collision between the device 10 and the airframe of the aircraft to be avoided.

Naturally, the present invention may be subjected to numerous variations as to its implementation. Although one embodiment is described above, it will readily be understood that it is not conceivable to identify exhaustively all possible embodiments. It is naturally possible to envisage replacing any of the means described by equivalent means without going beyond the ambit of the present invention.

What is claimed is:

1. A rotor aircraft comprising:
   a winch having an extendable cable, wherein the cable extends to an extended length being at least three times a rotor diameter of a main rotor of the aircraft; and
   a device for launching and recovering a drone, the device including:
     a fastener hook for fastening the device to the cable of the winch;
     a docking plate for docking the drone; and
     a flared guide basket secured to the docking plate for guiding the drone towards the docking plate,
   wherein the cable is extended to the extended length for launching and recovering the drone in the device;
   wherein the flared guide basket has a truncated cone shape and downward-facing opening for receiving the drone, and has the docking plate at the opposite end of the basket.

2. The aircraft according to claim 1, wherein the docking plate is connected to the fastener hook by slings.

3. The aircraft according to claim 1, including a drone suitable for being secured to the device, the drone including peripheral protection means to protect against impacts with the device.

4. The aircraft according to claim 1, wherein the device includes at least one reversible electromagnet secured to the docking plate to selectively magnetize the docking plate, wherein the electromagnet is powered to magnetize the docking plate in order secure the drone to the docking plate, and wherein the electromagnet is unpowered to demagnetize the docking plate in order to release the drone from the docking plate.

5. The aircraft according to claim 4 wherein the device includes at least one rechargeable battery arranged on the docking plate for electrically powering the at least one reversible electromagnet.

6. The aircraft according claim 4, including a drone suitable for being secured to the device and including at least one magnet for being reversibly fastened to magnetic docking plate of the device.

7. The aircraft according to claim 1, wherein the guide basket of the device includes a plurality of deformable tubes extending away from the aircraft and connecting the docking plate to a ring defining an inlet opening for the drone heading towards the docking plate.

8. The aircraft according to claim 7, wherein the deformable tubes are spaced apart by a separation distance being less than a circumscribed diameter of the drone, and wherein an opening diameter of the inlet is at least three times the circumscribed diameter of the drone.

9. The aircraft according to claim 1, wherein the docking plate is formed of a metal material.

10. The device according to claim 1, wherein when the drone is secured to the docking plate, the drone is positioned entirely within a volume of the flared guide basket.

* * * * *